United States Patent [19]

Tradt

[11] 4,429,266

[45] Jan. 31, 1984

[54] METHOD OF CONTROLLING AN INDUSTRIAL ROBOT

[75] Inventor: Hans R. Tradt, Friedberg, Fed. Rep. of Germany

[73] Assignee: Kuka Schweissanlagen & Roboter GmbH, Augsburg, Fed. Rep. of Germany

[21] Appl. No.: 329,510

[22] Filed: Dec. 10, 1981

[30] Foreign Application Priority Data

Dec. 11, 1980 [DE] Fed. Rep. of Germany ....... 3046634

[51] Int. Cl.$^3$ .............................................. G05B 19/42
[52] U.S. Cl. ................................... 318/568; 318/632; 364/513
[58] Field of Search ................. 318/568, 632; 364/513

[56] References Cited

U.S. PATENT DOCUMENTS

| | | | |
|---|---|---|---|
| 4,011,437 | 3/1977 | Hohn | 318/568 X |
| 4,025,838 | 5/1977 | Watanabe | 318/568 |
| 4,105,937 | 8/1978 | Tuda et al. | 318/568 |
| 4,140,953 | 2/1979 | Dunne | 318/632 X |
| 4,362,977 | 12/1982 | Evans et al. | 318/632 X |

Primary Examiner—B. Dobeck
Attorney, Agent, or Firm—Karl F. Ross

[57] ABSTRACT

An industrial robot, designed to machine a workpiece by means of a tool supported on an extremity of a mobile arm, is controlled by a programmer whose memory is initially loaded with a preliminary program including the locations of a multiplicity of closely juxtaposed but discrete points on the workpiece surface and instructions for the guidance of that extremity establishing rectilinear or circularly arcuate paths between these points. With the tool replaced by a sensor contacting a pattern corresponding to the desired shape of the workpiece, the preliminary program is executed and deviations from the established paths are registered to modify the stored instructions, thereby converting the preliminary program into a definite program subsequently used in shaping the actual workpiece.

5 Claims, 4 Drawing Figures

METHOD OF CONTROLLING AN INDUSTRIAL ROBOT

FIELD OF THE INVENTION

My present invention relates to a method of programming an industrial robot, designed to machine a workpiece with the aid of a tool carried on a free extremity of a mobile arm with several degrees of freedom.

BACKGROUND OF THE INVENTION

An industrial robot of the general type here contemplated is known, for example, from U.S. Pat. No. 4,105,937. According to that patent, the free extremity of the robot arm can be fitted with a sensor including a tracing tip which is moved along a path conforming to the desired workpiece shape. The sensor emits a location signal to be stored in a memory of a programmer as an instruction for the guidance of a tool subsequently mounted on the robot arm in lieu of the sensor.

In many instances it is necessary to produce a number of workpieces of similar shapes differing only in minor structural details from one another. With conventional techniques, however, the program memory of the robot must be individually loaded for each type of workpiece on the basis of data obtained by the scanning of respective patterns with a sensor such as the tracing tip of the aforementioned U.S. patent. If the patterns have an intricate configuration, the sensor must have a large stroke relative to its supporting arm and the logical circuitry of the programmer will have to be rather complex.

OBJECTS OF THE INVENTION

The general object of my present invention, therefore, is to provide a simplified method of programming an industrial robot of the type referred to.

A more particular object is to provide a programming method which facilitates the changeover among patterns differing from one another only in minor respects.

SUMMARY OF THE INVENTION

In accordance with my present invention, a first program memory for the control of such an industrial robot is loaded with data giving the locations e.g. in terms of cartesian coordinates—of a multiplicity of closely juxtaposed but discrete skeletal points on a pattern surface conforming to the desired shape of a workpiece to be machined. The first program memory is further loaded with instructions for the guidance of the free sensor-carrying extremity of the robot arm along intervening lines which roughly parallel the paths linking the discrete points on the pattern surface while letting the sensor trace these paths. Deviations of the actual paths from the lines of guidance, as determined by the sensor, are used for modifying the instructions stored in the first memory upon the transfer of the contents thereof to a second memory to establish a definite program for the guidance of a tool subsequently replacing the sensor on the free arm extremity.

Thus, the first memory may initially contain a simple preliminary program according to which the sensor-carrying arm extremity would travel along rectilinear or circularly arcuate intervening lines which can be very easily precalculated; the sensor need only have a limited stroke relative to its support and the information derived from its displacement can be registered in a data store of small capacity.

A system for implementing the method of my invention, therefore, comprises such a data store connected as a first program memory to the sensor when the latter is positioned in lieu of a machining tool on the extremity of the robot arm. This data store and the second program memory are connectable to calculating means for modifying the instructions of the preliminary program on the basis of the information supplied by the sensor.

BRIEF DESCRIPTION OF THE DRAWING

The above and other features of my invention will now be described in greater detail with reference to the accompanying drawing in which.

SPECIFIC DESCRIPTION

Figure 1:
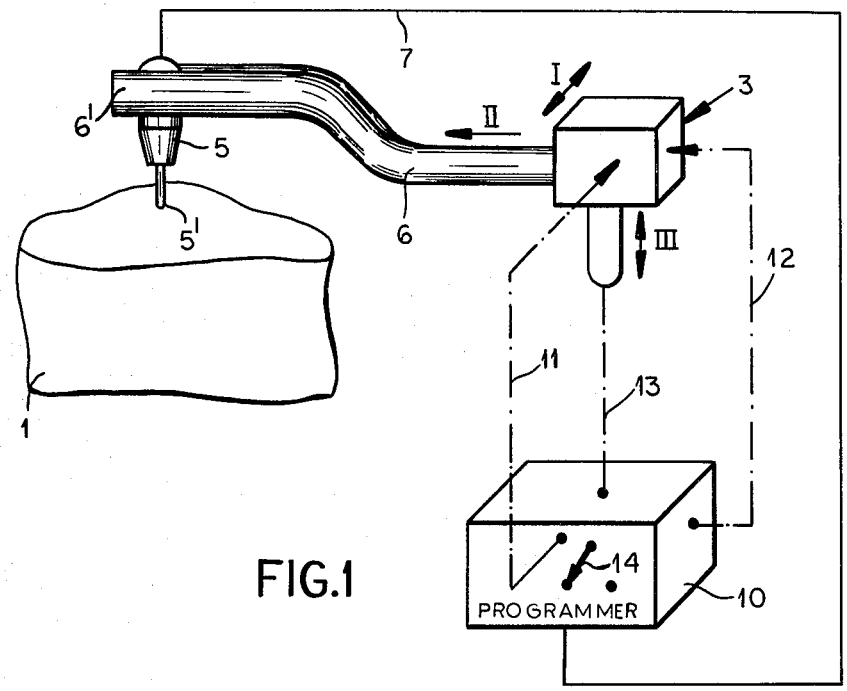
FIG. 1 is a somewhat diagrammatic perspective view of a robot embodying my invention.

In FIG. 1 I have shown a pattern 1 with a surface conforming to the desired shape of a workpiece to be machined by a robot 3 according to my invention. This robot has an elongate arm 6 with a free extremity 6' supporting a sensor 5 with a tracing tip 5'; sensor 5 is replaceable by a nonillustrated machining tool whose working end then occupies the position of tip 5'. Arm 6 has at least three degrees of freedom, i.e. mobility in two horizontal and a vertical direction, as indicated by arrows I, II and III; in practice, the arm extremity 6' may have additional degrees of freedom such as rotatability about the centerline of the arm, for example. Sensor 5 may be of the type disclosed in U.S. Pat. No. 4,101,405, its tip 5' being the end of a pin which is supported by a spring and surrounded by transformer windings signaling its vertical displacement via a line 7 to a programmer 10.

To simplify the description, tracing tip 5' is assumed to have only one degree of freedom, i.e. vertical mobility relative to arm extremity 6'. In a more elaborate construction, however, the sensor could have a swivelable head and comprise several parallel pins, such as those shown in the patent last referred to, enabling it to assume a position which is always perpendicular to the pattern surface; signals indicating the angular orientation of the tracing tip relative to the arm extremity would then also have to be conveyed to the programmer.

The lateral, longitudinal and vertical displacement of arm extremity 6', as indicated by arrows I, II and III, is brought about by drive means schematically represented by dot-dash lines 11, 12 and 13. Programmer 14 is shown provided with a manual switch 14 enabling a changeover from a pattern-tracing mode to a machining mode.

Figure 2:
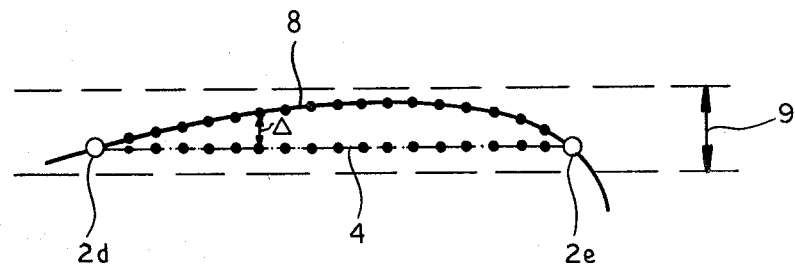
FIG. 2 is a graph illustrating two discrete points on the surface of a pattern, interconnected by a straight line, and an actual guidance path deviating from that line within the limits of mobility of a sensor tracing that pattern.
Figure 3:
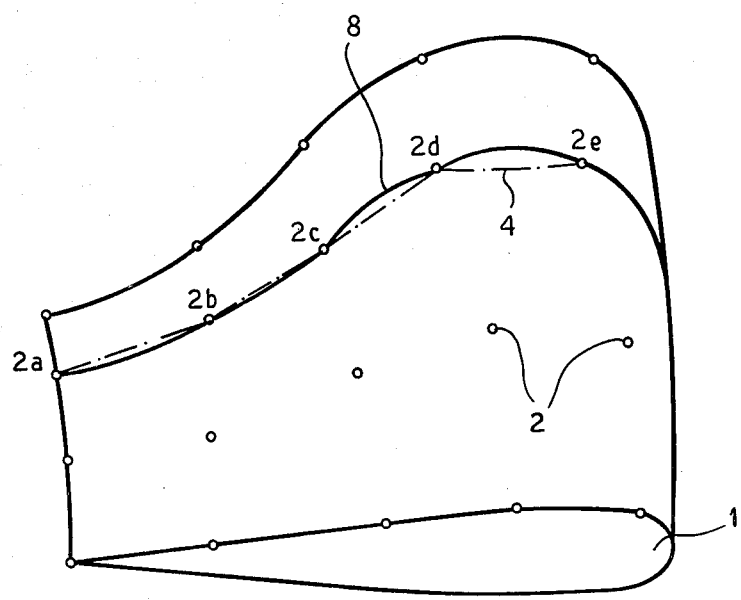
FIG. 3 shows a larger area of a pattern provided with a multiplicity of discrete points on a surface traceable by a sensor on the robot of FIG. 1.

In FIGS. 2 and 3 I have shown a multiplicity of closely spaced but discrete surface points 2 linked by straight lines 4 in whose direction the arm extremity 6' will travel in response to preliminary instructions stored in a memory of programmer 10 as more fully described hereinafter with reference to FIG. 4. As the tip 5' of sensor 5 contacts the surface of pattern 1 during such displacement, it will move up or down to trace actual curvilinear paths 8 defined by that surface. Thus, for example, arm extremity 6' will move parallel to a series of dot-dash lines 4 interconnecting skeletal points 2a, 2b, 2c, 2d, 2e while the tracing tip 5' follows the curve 8 deviating slightly from these lines. The maximum deviation is limited by the length of the sensor stroke indicated at 9 in FIG. 2.

Figure 4:
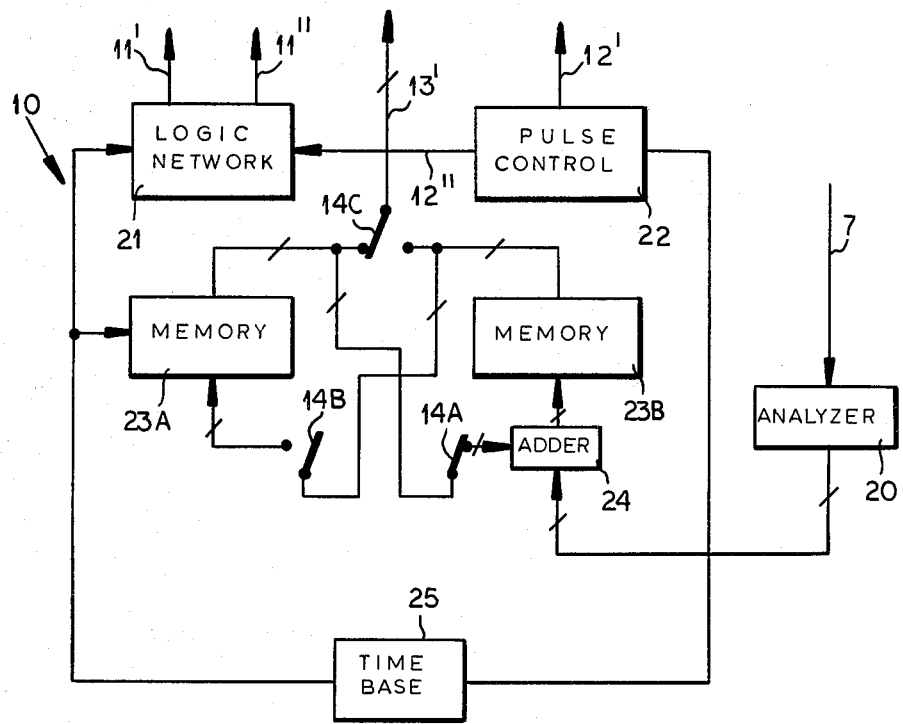
FIG. 4 is a block diagram of a programmer controlling the operation of the robot.

The transverse drive 11 of robot arm 6 is stepped alternately forward and backward, by clock pulses from a time base 25 shown in FIG. 4, via a logic network 21 having output leads 11' and 11". These clock pulses are also fed to a counter 22 whose output lead 12' periodically energizes the longitudinal robot drive 12 while another output lead 12" reverses the transverse drive 11 by causing a switchover from lead 11' to lead 11", or vice versa, after a certain number of steps corresponding to a linear scan of the surface of pattern 1 (FIG. 1). The same clock pulses successively address the cells of a memory 23A for reading out their contents via an armature 14C of switch 14 to a multiple 13' for raising or lowering the arm 6 by means of vertical drive 13 after each horizontal step of the arm by drive 11 or 12. Preliminary instructions stored in these memory cells are of such nature that arm extremity 6', moving in successive sweeps along adjoining transverse zones of the pattern surface, executes a multiplicity of strokes while traveling on a straight line (paralleling lines 4 of FIGS. 2 and 3) from one surface point 2 to the next. These strokes, of course, should be as short as possible to facilitate an approximation of a continuously machined workpiece surface. Sensor tip 5', undergoing a vertical displacement relative to its support 6', signals a deviation Δ between its actual travel path 8 and the straight line 4 (see FIG. 2) by way of line 7 to an analyzer 20, FIG. 4, after each incremental shift of extremity 6' by a clock pulse.

A digital code measuring the motion of sensor tip 5' is fed by analyzer 20 to an adder 24 which, in the illustrated position of switch 14, also receives via an armature 14A the positioning instructions from the output of memory 23A and feeds the algebraic sum of these data to another memory 23B which thus stores modified instructions for the control of arm drive 13. These instructions constitute a definite program to be used for the control of the arm drive after the sensor 5 has been replaced by a machining tool and switch 14 has been moved to its alternate position. Deviation analyzer 20 is cut off upon the removal of sensor 5; the instructions read out from memory 23B in the machining mode are also loaded unaltered via an armature 14B of switch 14 into memory 23A.

A return of switch 14 to its previous position then enables the aforedescribed pattern-scanning procedure to be used for a further modification of the contents of memory 23A, with transfer to memory 24B, in order to prepare for the machining of a slightly different workpiece configuration as the sensor tip 5' is guided over a correspondingly shaped pattern.

The loading of memory 23A with the preliminary pattern first described may be performed by the tracing of a basic pattern or skeleton, representing a crude approximation of the desired pattern but having the reference points 2 at the proper locations, or by a computer to which the coordinates of these reference points are fed in advance.

If armature 14B is omitted, memory 23A will retain the basic program to be used in the aforedescribed manner for loading memory 23B with data pertaining to a variety of interrelated but mutually distinct final patterns. In that instance the memory 23A may be less elaborate since it will have to store only the locations of the relatively few reference points 2. The illustrated arrangement, on the other hand, enables a progressive development of a series of programs for the machining of increasingly complex patterns. With the aid of a second adder inserted between switch armature 14B and memory 23A, having another input connected in parallel with that of adder 24 to the output of analyzer 20, intermediate programs could be alternately loaded into memories 23A and 23B during the tracing of successive patterns by the sensor.

I claim:

1. A method of programming an industrial robot for machining a workpiece with the aid of a tool carried on a free extremity of a mobile robot arm, comprising th steps of:
   (a) providing a pattern with a surface conforming to the desired shape of the workpiece;
   (b) fitting the extremity of the robot arm with a sensor in the position of the machining tool;
   (c) loading a first memory with data giving the locations of a multiplicity of closely juxtaposed but discrete skeletal points on the surface of said pattern and with instructions for the guidance of said extremity along intervening lines of uniform character roughly paralleling the paths linking said points on the pattern surface;
   (d) tracing said pattern with a tip of said sensor under the control of the contents of said first memory by successively displacing said extremity across all said skeletal points with yieldable entrainment of said sensor by said extremity enabling limited movements of said tip relative to said robot arm in response to deviations of said paths from said intervening lines between adjacent skeletal points; and
   (e) transferring the contents of said first memory, during the tracing of the pattern in step (d) to a second memory while modifying, on the basis of the deviations represented by the relative movements of said tip, the instructions accompanying said data to establish a definite program for the guidance of a tool replacing said sensor on said extremity.

2. The method defined in claim 1 wherein said intervening lines are rectilinear.

3. The method defined in claim 1 wherein the data and instructions of step (c) are preserved unmodified in said first memory for the subsequent tracing of another pattern having the same skeletal points.

4. The method defined in claim 1 wherein said locations are defined by cartesian coordinates, the robot arm having three degrees of freedom corresponding to respective coordinate axes, the displacement in the direction of one axis being stored in cells of said first memory addressed by timing pulses correlated with shifts along the other coordinate axes.

5. The method defined in claim 4 wherein said tip moves in response to said deviations in a direction parallel to said one coordinate axis.

* * * * *